UNITED STATES PATENT OFFICE.

OTTO THALLNER, OF BISMARCKHÜTTE, GERMANY, ASSIGNOR TO THE FIRM OF BISMARCK-HÜTTE, OF BISMARCKHÜTTE, GERMANY.

REFINING STEEL.

No. 919,493.     Specification of Letters Patent.     Patented April 27, 1909.

Application filed June 17, 1908. Serial No. 439,043.

*To all whom it may concern:*

Be it known that I, OTTO THALLNER, metallurgist, a subject of the German Emperor, and resident of Bismarckhütte, in the Province of Upper Silesia, German Empire, have invented certain new and useful Improvements in the Refining of Steel, of which the following is an exact specification.

This invention relates to a process for the production of high quality steel, in which the refining is effected in electric furnaces.

In the refining of steel in Bessemer, Martin or Thomas furnaces it has already been proposed to pass the steel after treatment in these furnaces into a crucible, which is lined with an acid lining for instance a fire proof lining in which silicic acid forms the principal component. According to the present invention the steel refined in an electric furnace having a basic lining, for example one in which lime forms the principal component, is passed into a crucible having an acid fire proof lining. The steel previously refined in the electric furnace is allowed to stand in the crucible for a few hours so that the remainder of the slag which has not been separated by the reaction in the furnace settles on the top of the material in the crucible. I have found that such a separation cannot be produced by prolonged treatment in the electric furnace for the reason that the disturbance of the material between the electrodes is too violent to permit of the settling of the finely mixed particles of the slag which have not been removed by the reaction and which are distributed through the molten mass like the constituents in an emulsion. When allowed to remain in the crucible however the influence of the basic lined electric furnace is counterbalanced as in the crucible silicon is taken up and thereby the steel receives the typical properties of what is usually called crucible steel. The process may be still further improved by carrying out the first stages of the refinement in the usual Bessemer, Thomas or Martin furnace and after refinement of the steel has been carried out as far as possible in such a furnace the steel is treated in an electric furnace and then allowed to settle in a crucible as described above. In this way the extraction of the phosphorus, sulfur and oxygen can be effected to a much greater extent than is possible in Martin and like furnaces. Further by treating the steel first in a Martin or like furnace and then carrying out the refining to a greater extent in an electric furnace and thereafter allowing the fine slag to separate in a crucible with an acid lining a much more economical treatment is obtained.

The process also permits of the production of alloys of iron in a very controllable manner or the addition of modifying agents as is usual in the crucible process. These additions can only be added with great difficulty in an electric furnace as the temperature conditions in the electric furnace are so variable that when the additions usual in the crucible process are made, totally different results as regards grain and structure of the metal and other physical qualities are obtained. These difficulties can be avoided according to the present process by passing the steel into the crucible before the addition of the modifying constituents. Likewise the carbonizing of the steel can take place in the crucible by means of suitable known carbonizing agents.

I claim:

1. The process for refining steel consisting in previously refining the steel in a basic electric furnace and afterward leading said refined steel into a crucible for the purpose of settling and further treatment.

2. The process for refining steel consisting in previously refining the steel in a basic lined electric furnace and then treating said partially refined steel in a crucible for the purpose of settling and adding modifying additions to the metal in said crucible.

3. The process for refining steel consisting in previously refining the steel in a basic lined electric furnace and afterward leading said partially refined steel into a crucible for the purpose of settling and adding carbonizing agents to said metal in the crucible.

4. The process for the production of highly refined steel comprising treating the steel in a fuel heated furnace, then carrying the refining to a higher degree in a basic lined electric furnace, after which the steel so refined is allowed to settle and take up acid properties in a crucible, substantially as described.

In witness whereof I have hereunto set my hand in the presence of two witnesses.

OTTO THALLNER.

Witnesses:
ERNST KÄHL,
ERNST KATZ.